(12) United States Patent
Yang et al.

(10) Patent No.: US 11,316,838 B2
(45) Date of Patent: Apr. 26, 2022

(54) METHOD AND APPARATUS FOR TRANSMITTING ROUTER SECURITY INFORMATION

(71) Applicant: BEIJING XIAOMI MOBILE SOFTWARE CO., LTD., Beijing (CN)

(72) Inventors: Guizhen Yang, Beijing (CN); Yufang Li, Beijing (CN); Daokuan Liu, Beijing (CN); Dian Fan, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 120 days.

(21) Appl. No.: 16/833,920

(22) Filed: Mar. 30, 2020

(65) Prior Publication Data

US 2021/0144126 A1 May 13, 2021

(30) Foreign Application Priority Data

Nov. 7, 2019 (CN) .......................... 201911078669.1

(51) Int. Cl.
*H04L 9/40* (2022.01)
*H04L 9/32* (2006.01)
*H04L 29/06* (2006.01)

(52) U.S. Cl.
CPC ........ *H04L 63/0428* (2013.01); *H04L 9/3234* (2013.01); *H04L 63/08* (2013.01)

(58) Field of Classification Search
CPC ... H04L 63/0428; H04L 9/3234; H04L 63/08; H04L 63/061; H04L 63/1441;
(Continued)

(56) References Cited

U.S. PATENT DOCUMENTS 7,180,909 B1 * 2/2007 Achler ................ H03M 7/3084
 370/466
7,392,378 B1 * 6/2008 Elliott .................... H04L 9/0852
 380/278

(Continued)

FOREIGN PATENT DOCUMENTS

CN 106992934 A 7/2017
CN 109302437 A 2/2019

(Continued)

OTHER PUBLICATIONS

DVB Organization: Wireless Specifications, Wi-Fi Roaming Architecture and Interfaces Specification, "WR-SP-WiFi-ROAM-I03-140311", Geneva, Switzerland, Mar. 11, 2014.

(Continued)

*Primary Examiner* — Aravind K Moorthy
(74) *Attorney, Agent, or Firm* — Syncoda LLC; Feng Ma

(57) ABSTRACT

A method for transmitting router security information, applied in a router, includes: transmitting, to a terminal requesting to acquire router security information, a generated link of a local area network for transmitting the router security information; receiving an access request initiated by the terminal through a network address to which the link of the local area network is pointed; and, returning, through the local area network, a response to the access request to the terminal, the response containing encrypted router security information. The encrypted router security information can therefore be transmitted by a local network established for transmitting security information by a router. In this security information transmission mode, the possibility of remotely acquiring router security information is eliminated. Moreover, the situation where the router security information is transmitted on the cloud is also avoided, and the security of privacy information of terminal devices is improved.

18 Claims, 8 Drawing Sheets

(58) Field of Classification Search
CPC ..... H04L 9/0869; H04L 9/088; H04L 9/3213; H04L 63/0807; H04L 63/10; H04W 12/047; H04W 12/122; H04W 84/12
See application file for complete search history.

(56) References Cited

U.S. PATENT DOCUMENTS

| | | | | |
|---|---|---|---|---|
| 7,441,267 B1* | 10/2008 | Elliott | H04L 63/0428 | 713/153 |
| 7,512,799 B1* | 3/2009 | Chow | H04L 63/0815 | 713/172 |
| 7,610,485 B1* | 10/2009 | Yadav | H04H 20/82 | 713/163 |
| 7,818,790 B1* | 10/2010 | Burns | H04L 63/08 | 726/7 |
| 8,218,435 B2* | 7/2012 | Chu | H04L 63/08 | 709/229 |
| 8,321,661 B1* | 11/2012 | Liang | H04L 63/1483 | 713/154 |
| 8,407,768 B1* | 3/2013 | Hayter | H04L 63/0853 | 726/5 |
| 8,745,384 B2* | 6/2014 | Persaud | H04L 63/0428 | 713/165 |
| 8,837,739 B1* | 9/2014 | Sexton | H04L 9/0825 | 380/278 |
| 8,898,743 B1* | 11/2014 | Kowalik | H04W 12/08 | 726/4 |
| 9,723,003 B1* | 8/2017 | McClintock | H04L 63/10 | |
| 10,412,051 B2* | 9/2019 | Zaruba | H04B 7/1851 | |
| 10,855,664 B1* | 12/2020 | Ziraknejad | H04W 4/021 | |
| 10,979,403 B1* | 4/2021 | Mutescu | G06F 21/31 | |
| 11,159,498 B1* | 10/2021 | Casu | H04L 9/0825 | |
| 2002/0114469 A1* | 8/2002 | Faccin | H04L 9/3271 | 380/270 |
| 2004/0098485 A1* | 5/2004 | Larson | H04L 45/00 | 709/227 |
| 2004/0123148 A1* | 6/2004 | Offermann | H04L 63/0428 | 726/5 |
| 2004/0165551 A1* | 8/2004 | Krishnamurthi | H04L 63/1458 | 370/328 |
| 2005/0036509 A1* | 2/2005 | Acharya | H04N 21/4753 | 370/467 |
| 2006/0010389 A1* | 1/2006 | Rooney | H04L 63/1425 | 715/736 |
| 2006/0092919 A1* | 5/2006 | Hallmark | H04L 29/06027 | 370/352 |
| 2007/0274230 A1* | 11/2007 | Werber | H04L 45/563 | 370/254 |
| 2007/0274314 A1* | 11/2007 | Werber | H04L 41/5022 | 370/392 |
| 2008/0162926 A1* | 7/2008 | Xiong | H04L 63/0892 | 713/155 |
| 2010/0037046 A1* | 2/2010 | Ferg | H04L 63/08 | 713/155 |
| 2010/0070771 A1 | 3/2010 | Chen et al. | | |
| 2010/0226280 A1* | 9/2010 | Burns | H04L 63/0209 | 370/254 |
| 2011/0295928 A1* | 12/2011 | Siegel | H04L 67/22 | 709/203 |
| 2012/0144464 A1* | 6/2012 | Fakhrai | H04L 63/08 | 726/5 |
| 2012/0174204 A1* | 7/2012 | Sturm | G06F 16/2457 | 726/7 |
| 2012/0254617 A1* | 10/2012 | Li | H04L 63/061 | 713/171 |
| 2013/0239189 A1* | 9/2013 | Ionescu | H04L 63/08 | 726/6 |
| 2013/0250801 A1* | 9/2013 | Kennedy | H04L 41/0806 | 370/254 |
| 2013/0305329 A1* | 11/2013 | Zhang | G06K 19/06037 | 726/6 |
| 2014/0167928 A1* | 6/2014 | Burd | G06F 16/972 | 340/12.5 |
| 2014/0379368 A1* | 12/2014 | Kim | H04W 12/02 | 705/2 |
| 2015/0067327 A1* | 3/2015 | Lipton | H04L 63/083 | 713/168 |
| 2015/0089593 A1* | 3/2015 | Herman | H04L 63/061 | 726/4 |
| 2015/0229608 A1* | 8/2015 | Schulz | H04L 41/0806 | 726/14 |
| 2015/0295899 A1* | 10/2015 | Chen | H04L 63/06 | 713/160 |
| 2015/0381366 A1* | 12/2015 | Zhang | H04W 12/04 | 713/155 |
| 2016/0094994 A1* | 3/2016 | Kirkby | H04W 12/06 | 380/270 |
| 2016/0110528 A1* | 4/2016 | Gupta | H04W 12/06 | 726/19 |
| 2016/0127348 A1* | 5/2016 | Bradley | H04L 9/3213 | 713/168 |
| 2016/0142389 A1* | 5/2016 | Denker | G07B 15/00 | 726/4 |
| 2016/0149880 A1* | 5/2016 | Paczkowski | H04L 45/50 | 726/4 |
| 2016/0182493 A1* | 6/2016 | Volini | H04L 63/08 | 713/158 |
| 2016/0188887 A1* | 6/2016 | Ghafourifar | G06F 21/6209 | 713/189 |
| 2016/0294793 A1* | 10/2016 | Larson | H04L 61/2038 | |
| 2017/0070507 A1* | 3/2017 | Leconte | H04L 63/10 | |
| 2017/0104727 A1* | 4/2017 | Jerkeby | H04L 63/1466 | |
| 2017/0111783 A1* | 4/2017 | Zhang | H04W 8/20 | |
| 2017/0118215 A1* | 4/2017 | Varadarajan | H04L 63/10 | |
| 2017/0127467 A1* | 5/2017 | Fan | H04L 12/283 | |
| 2017/0155675 A1* | 6/2017 | Howe | H04L 63/1425 | |
| 2017/0230410 A1* | 8/2017 | Hassanzadeh | G06N 20/00 | |
| 2017/0238236 A1* | 8/2017 | Miller | H04W 4/70 | 370/338 |
| 2017/0359448 A1* | 12/2017 | Sung | H04L 63/0272 | |
| 2018/0114237 A1* | 4/2018 | Kirk | H04L 67/10 | |
| 2018/0115528 A1* | 4/2018 | Rotvold | H04L 67/12 | |
| 2018/0189502 A1* | 7/2018 | Kumar | G06F 21/6254 | |
| 2018/0278611 A1* | 9/2018 | Tan | H04L 9/3268 | |
| 2018/0288694 A1* | 10/2018 | Gordon | H04W 72/0446 | |
| 2018/0337902 A1* | 11/2018 | Wood | H04L 63/061 | |
| 2018/0337925 A1* | 11/2018 | Wallace | G06Q 20/3674 | |
| 2019/0057208 A1* | 2/2019 | Cannariato | G06F 21/335 | |
| 2019/0150206 A1* | 5/2019 | Su | H04W 76/10 | 370/328 |
| 2019/0215374 A1* | 7/2019 | Ragsdale | H04L 9/0891 | |
| 2019/0246344 A1* | 8/2019 | Prasad | H04W 4/38 | |
| 2019/0260712 A1* | 8/2019 | Waterman | H04L 9/08 | |
| 2019/0268376 A1* | 8/2019 | Park | H04L 9/0819 | |
| 2019/0306154 A1* | 10/2019 | Girdhar | H04W 12/065 | |
| 2019/0327125 A1* | 10/2019 | McChord | G06F 11/1464 | |
| 2019/0354685 A1* | 11/2019 | Tomasso | G06F 21/575 | |
| 2019/0379706 A1* | 12/2019 | Verma | H04L 63/105 | |
| 2019/0379001 A1* | 12/2019 | Sanaullah | H04L 63/105 | |
| 2019/0391980 A1* | 12/2019 | Mundar | H04L 63/0807 | |
| 2020/0022074 A1* | 1/2020 | Shimojou | H04L 63/0892 | |
| 2020/0252792 A1* | 8/2020 | Amin | H04W 12/033 | |
| 2020/0311712 A1* | 10/2020 | Sharma | G06Q 20/20 | |

FOREIGN PATENT DOCUMENTS

| | | |
|---|---|---|
| CN | 110248364 A | 9/2019 |
| WO | 2015050892 A1 | 4/2015 |

OTHER PUBLICATIONS

Extended European Search Report in Application No. 20168750.6, dated Sep. 24, 2020.
CN first office action in Application No. 201911078669.1, dated Jan. 6, 2022.

* cited by examiner

METHOD AND APPARATUS FOR TRANSMITTING ROUTER SECURITY INFORMATION

CROSS-REFERENCE TO RELATED APPLICATION

The present application claims priority to Chinese Patent Application No. 201911078669.1 filed on Nov. 7, 2019, the disclosure of which is hereby incorporated by reference in its entirety.

BACKGROUND

When applications (APPs) of a user's terminal device need to acquire router security information (e.g., the password of Wi-Fi of the router) in some scenarios, the APPs typically request to acquire route security information to a cloud server.

APPs are applications on the terminal device that needs to acquire router security information, and the communication between APPs and the server is encrypted by using https+ account authentication.

The server can passively receive a request for acquiring router security information transmitted by an APP, and actively transmit a request for acquiring router security information to a router.

The router is a router terminal device that stores the router security information and can provide an Internet access function, and there is an encrypted channel between the router and the server.

In the related art, the method for requesting, by the APP on the user's terminal device, the server to acquire router security information is shown in FIG. 1. The method may include the following operation steps.

Step S10: An APP sends a request for acquiring router sensitive data to a server through an https request.

Step S11: The server authenticates the APP that initiates the https request, and upon confirming that the APP has an administration right over the router, sends a request for acquiring router security information to router through an encrypted channel.

In this step, when the server authenticates the APP that initiates the https request, it is generally necessary to confirm the binding relationship between the user account currently using the APP and this router, and then confirm that the APP has an administration right over the router.

Step S12: The router returns router sensitive data to the server through an encrypted channel.

Step S13: The server transmits a response to the https request to the APP, and the server returns the router sensitive data to the APP through the transmitted response.

SUMMARY

The present disclosure relates to the technical field of router security, and more specifically to a method and apparatus for transmitting router security information.

Various embodiments of the present disclosure provide a method and apparatus for transmitting router security information.

In accordance with a first aspect of the embodiments of the present disclosure, a method for transmitting router security information is provided, which is applied in a router, including:

transmitting, to a terminal requesting to acquire router security information, a generated link of a local area network for transmitting the router security information;

receiving an access request initiated by the terminal through a network address to which the link of the local area network is pointed; and returning, through the local area network, a response to the access request to the terminal, the response containing encrypted router security information.

In some embodiments, in the method, the transmitting, to a terminal requesting to acquire router security information, a generated link of a local area network for transmitting the router security information includes:

encrypting the generated link of the local area network for transmitting the router security information, and transmitting the encrypted link of the local area network to the terminal requesting to acquire the router security information.

In some embodiments, the method further includes steps of:

acquiring authentication information from the access request initiated by the terminal; and verifying the authentication information; and the returning, through the local area network, the response to the access request to the terminal includes:

when a result of verification of the authentication information is successful authentication, returning, through the local area network, the response to the access request to the terminal.

In some embodiments, the method further includes:

in the process of transmitting, to the terminal requesting to acquire the router security information, the generated link of the local area network for transmitting the router security information, transmitting the authentication information to the terminal, the authentication information being used for an authentication operation performed when the terminal accesses the link of the local area network.

In some embodiments, in the method, the authentication information includes a random token, and the verifying the authentication information includes:

verifying whether the random token satisfies a set condition, and determining the result of verification as successful authentication when the random token satisfies the set condition;

wherein the set condition includes any one or two of the following:

the random token is consistent with a random token generated by a router during the generation of the link of the local area network; and the time of the random token is within a set validity period.

In some embodiments, the method further includes steps of:

receiving, through a server, an acquisition request for the router security information initiated by the terminal; and generating, according to the acquisition request, the link of the local area network for transmitting the router security information.

In some embodiments, the method further includes steps of:

acquiring a first key and/or a second key from the acquisition request for the router security information initiated by the terminal, the first key being used for an encryption operation performed on the router security information, the second key being used for an encryption operation performed on the link of the local area network.

In accordance with a second aspect of the embodiments of the present disclosure, a method for transmitting router security information is provided, which is applied in a terminal device, includes steps of:

initiating an access request to a router, through a network address to which acquired link of a local area network for transmitting router security information is pointed;

receiving, through the local area network, a response to the access request, and acquiring encrypted router security information from the response; and decrypting the encrypted router security information to obtain the router security information.

In some embodiments, the method further includes steps of:

transmitting, through a server, an acquisition request for the router security information to the router;

receiving, through the server, a response to the acquisition request transmitted by the router, the response to the acquisition request containing the encrypted link of the local area network; and decrypting the encrypted link of the local area network to obtain the link of the local area network.

In some embodiments, the method further includes steps of:

transmitting authentication information in the access request, the authentication information being used for an authentication operation by the router when the terminal accesses the link of the local area network.

In some embodiments, the method further includes steps of:

upon acquiring the link of the local area network for transmitting the router security information, extracting the authentication information from the link of the local area network.

In some embodiments, in the method, the authentication information includes a random token.

In some embodiments, the method further includes:

in the process of transmitting, through the server, the acquisition request for router security information to the router, transmitting a first key and/or a second key in the acquisition request, the first key being used for an encryption operation performed on the router security information, the second key being used for an encryption operation performed on the link of the local area network.

In accordance with a third aspect of the embodiments of the present disclosure, an apparatus for transmitting router security information is provided, includes:

a processor; and memory storing a computer program that, when executed by the processor, causes the processor to:

transmit, to a terminal requesting to acquire router security information, a generated link of a local area network for transmitting the router security information;

receive an access request initiated by the terminal through a network address to which the link of the local area network is pointed; and return, through the local area network, a response to the access request to the terminal, the response containing encrypted router security information.

In some embodiments, the computer program further causes the processor to:

encrypt the generated link of the local area network for transmitting the router security information; and transmit the encrypted link of the local area network to the terminal requesting to acquire the router security information.

In some embodiments, the computer program further causes the processor to:

acquire authentication information from the access request initiated by the terminal; and verify the authentication information; and return the response to the access request to the terminal through the link of the local area network when a result of verification of the authentication information is successful authentication.

In some embodiments, in the apparatus, the computer program further causes the processor to, in the process of transmitting, to the terminal requesting to acquire the router security information, the generated link of the local area network for transmitting the router security information, transmit the authentication information to the terminal, the authentication information being used for an authentication operation performed when the terminal accesses the link of the local area network.

In some embodiments, in the apparatus, the authentication information includes a random token, and the computer program further causes the processor to:

verify whether the random token satisfies a set condition, and determining the result of verification as successful authentication when the random token satisfies the set condition;

wherein the set condition includes any one or two of the following:

the random token is consistent with a random token generated by a router during the generation of the link of the local area network; and the time of the random token is within a set validity period.

In some embodiments, the computer program further causes the processor to;

receive, through a server, an acquisition request for the router security information initiated by the terminal; and generates, according to the acquisition request, the link of the local area network for transmitting the router security information.

In some embodiments, in the apparatus, the computer program further causes the processor to acquire a first key and/or a second key from the acquisition request for the router security information initiated by the terminal, the first key being used for an encryption operation performed on the router security information, the second key being used for an encryption operation performed on the link of the local area network.

In accordance with a fourth aspect of the embodiments of the present disclosure, an apparatus for transmitting router security information is provided, includes:

a processor; and a memory for storing a computer program that, when executed by the processor, causes the processor to:

initiate an access request to a router, through an acquired link of a local area network for transmitting router security information;

receive a response to the access request through the link of the local area network, and acquire encrypted router security information from the response; and decrypt the encrypted router security information to obtain the router security information.

In some embodiments, the computer program further causes the processor to:

transmit, through a server, an acquisition request for the router security information to the router;

receive, through the server, a response to the acquisition request transmitted by the router, the response to the acquisition request containing encrypted link of the local area network; and decrypt the encrypted link of the local area network in the response to the acquisition request to obtain the link of the local area network.

In some embodiments, in the apparatus, the computer program further causes the processor to transmit authentication information in the transmitted access request, the authentication information being used for an authentication operation performed by the router when the terminal accesses the link of the local area network.

In some embodiments, the computer program further causes the processor to:

extract the authentication information from the link of the local area network.

In some embodiments, in the apparatus, the authentication information includes a random token.

In some embodiments, in the apparatus, the computer program further causes the processor to transmit a first key and/or a second key in the transmitted acquisition request for the router security information, the first key being used for an encryption operation performed on the router security information, the second key being used for an encryption operation performed on the link of the local area network.

In accordance with a fifth aspect of the embodiments of the present disclosure, a non-temporary computer-readable storage medium is provided, a computer program stored in the storage medium, when executed by a processor of a terminal device, enabling the terminal device to execute a method for transmitting router security information, the method including steps of:

transmitting, to a terminal requesting to acquire router security information, a generated link of a local area network for transmitting the router security information;

receiving an access request initiated by the terminal through a network address to which the link of the local area network is pointed; and returning, through the local area network, a response to the access request to the terminal, the response containing encrypted router security information.

In accordance with an sixth aspect of the embodiments of the present disclosure, a non-temporary computer-readable storage medium is provided, a computer program stored in the storage medium, when executed by a processor of a mobile terminal, enabling the mobile terminal to execute a method for transmitting router security information, the method including steps of:

initiating an access request to a router, through an acquired link of a local area network for transmitting the router security information;

receiving, through the local area network, a response to the access request, and acquiring encrypted router security information from the response; and decrypting the encrypted router security information to obtain the router security information.

It should be understood that the foregoing general description and the following detailed description are merely exemplary and explanatory, and are not intended to limit the present disclosure.

BRIEF DESCRIPTION OF THE DRAWINGS

The accompanying drawings to be described herein are incorporated into this disclosure and constitute a part of this disclosure. These accompanying drawings show the embodiments of the present disclosure, and are used with this specification to explain the principle of various embodiments of the present disclosure.

DETAILED DESCRIPTION

Figure 1:
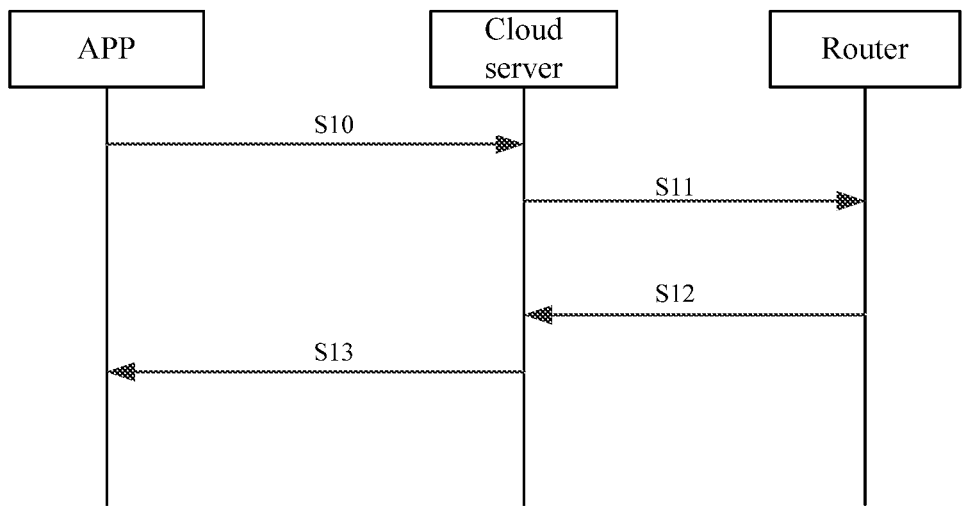
FIG. 1 is a flowchart of a method for requesting, by an APP on a user's terminal device to acquire router security information in the related art.

Exemplary embodiments will be described in detail herein, and examples in the exemplary embodiments are shown in the accompanying drawings. When the accompanying drawings are involved in the following description, unless otherwise indicated, identical reference numerals in different accompanying drawings indicate identical or similar elements. The implementations described in the following exemplary embodiments do not represent all implementations consistent with the present disclosure. On the contrary, the implementations are merely examples of apparatuses and methods consistent with some aspects of the present disclosure as described in the appended claims.

In a typical method, the router security information actually flows through a node which is the server, so that the leakage of privacy information when the server is compromised cannot be avoided. Moreover, the possibility of remotely acquiring router security information illegally when the user account is compromised (for example, the user's account password is leaked) cannot be avoided.

The router security information involved herein include information of all devices with privacy requirements, for example, the password of Wi-Fi of the router, the user's online account stored in the terminal device, the user's account password stored in the terminal device, information of the local area network accessed by the terminal device or the like.

Figure 2:
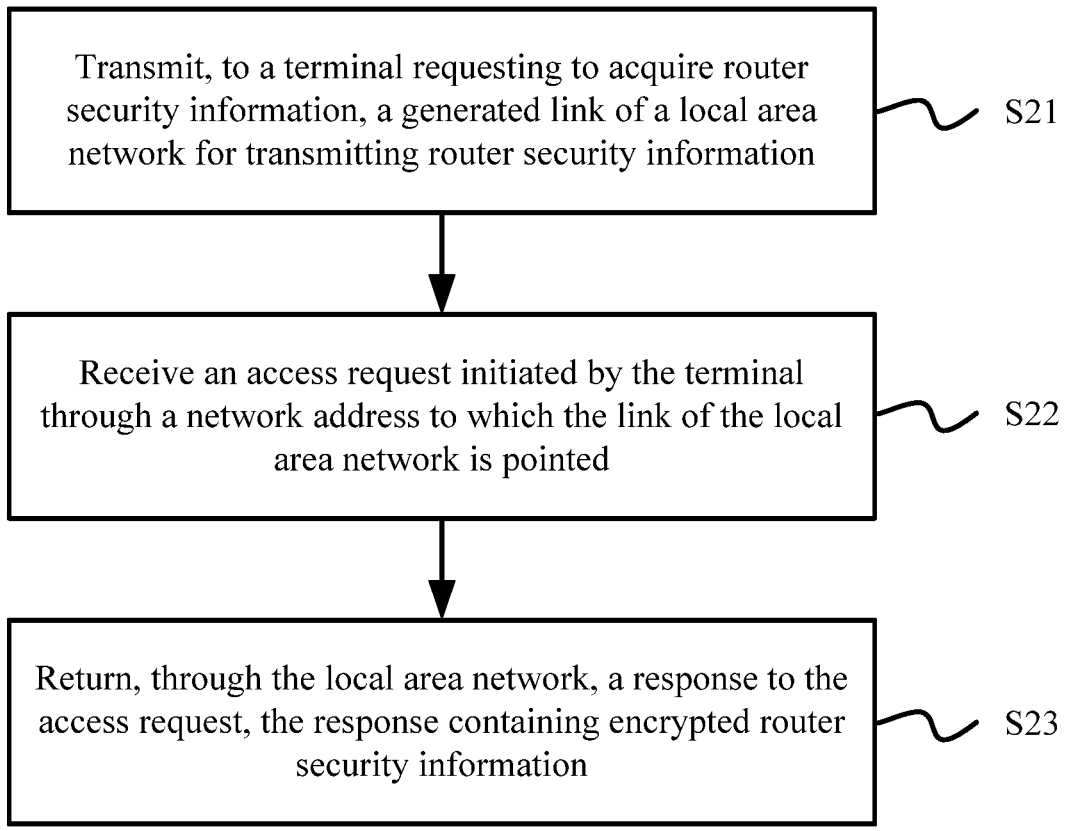
FIG. 2 is a flowchart of a method for transmitting router security information (on a router side) according to some embodiments.

FIG. 2 is a flowchart of a method for transmitting router security information according to some embodiments. The method may be executed by a router. The implementation process of this method is shown in FIG. 2, including the following steps.

Step S21: A generated link of a local area network for transmitting router security information is transmitted to a terminal requesting to acquire router security information.

Step S22: An access request initiated by the terminal through a network address to which the link of the local area network is pointed is received.

Step S23: A response to the access request is returned to the terminal through the local area network, the response containing encrypted router security information.

As such, in the method for transmitting router security information provided in this embodiment, a dedicated local area network is established to transmit the encrypted router security information by the router. Thus, the router security information is transmitted only in the dedicated local area network, so that the possibility of remotely acquiring the router security information is eliminated and the security of the router security information is ensured.

Moreover, no remote exchange is involved in the process of transmitting the route security information, and intermediate network elements such as a cloud server are omitted. By the mode of decreasing transmission network elements, the information transmission is more convenient, and the possibility of information leakage by intermediate network elements is avoided, so that the security of privacy information of a terminal device is improved.

These embodiments provide another method for transmitting router security information, during the execution of the step S21, the following operation is performed:

the router encrypts the generated link of the local area network, and transmits the encrypted link of the local area network to a terminal requesting to acquire router security information.

The router may convert the generated link of the local area network into a text, and encrypt and transmit the link of the local area network in the text format. In this way, the security of link of the local area network for transmitting router security information can be improved. For a terminal that receives the encrypted link of the local area network, a network address to which the link of the local area network is pointed can be obtained only by correct decryption, and the local area network generated on the router side is accessed through the network address to obtain the router security information. During the encryption of the link of the local area network by the router, the used keys and encryption algorithm may be configured in advance, or may be determined by the router and the terminal requesting to acquire the router security information through consultation.

The encryption algorithm may be any encryption algorithm, for example, a symmetric encryption algorithm or an asymmetric encryption algorithm or the like. For the symmetric encryption algorithm, the router is used as an encryption party, and the encryption is performed by using symmetric keys. For the asymmetric encryption algorithm, the router is used as an encryption party, and the encryption is performed by using a public key in the asymmetric keys.

Figure 3:
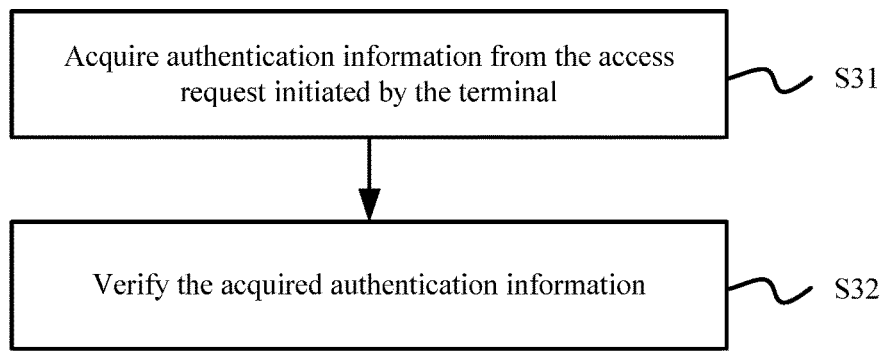
FIG. 3 is a flowchart of authenticating a terminal that initiates an acquisition request in the method for transmitting router security information (on the router side) according to some embodiments.

These embodiments provide another method for transmitting router security information. As shown in FIG. 3, after the execution of the step S22, the following operations may further be performed:

step S31: authentication information is acquired from the access request initiated by the terminal; and step S32: the acquired authentication information is verified.

Correspondingly, in the process of returning a response to the access request to the terminal in the step S23, it may be determined according to the result of operation in the step S32 whether to return a response to the access request to the terminal. For example, when the result of verification of the acquired authentication information is successful authentication, a response to the access request is returned to the terminal through the local area network.

When the result of verification of the acquired authentication information is failed authentication, a message indicating failed access is transmitted to the terminal through the local area network. The authentication information in the access request may be generated from the information on the terminal side. For example, the authentication information may be generated according to any one of or a combination of more of the user identifier of the terminal, the user key, the history information of accessing the router by the user or the like.

The authentication information may also be negotiated by the terminal side with the router side in advance. For example, it is possible to configure unique identification information or special information with validity or the like for a terminal authenticated by the router. In this case, the negotiated authentication information is shared in advance between two parties involved in the negotiation.

Thus, after the authentication operation is added in the router, it is determined according to the result of authentication of the terminal whether the terminal has a quantification of accessing the local area network for transmitting router security information. In this way, the security of the local area network can be better ensured, and the security of the router security information transmitted on the local area network can also be improved.

These embodiments provide another method for transmitting router security information. In this method, the authentication information is transmitted in the following way.

In the process of transmitting a generated link of a local area for transmitting router security information to the terminal requesting to acquire router security information, authentication information is transmitted to the terminal, the authentication information being used for an authentication operation when the terminal accesses the link of the local area network for transmitting router security information.

Thus, when the router transmits, to the terminal, the link of the local area network for transmitting router security information, the terminal that receives the link of the local area network is regarded as a terminal authenticated by the router. Therefore, in order to ensure that the router can recognize the authenticated terminal in the subsequent authentication operation, as an authentication party, the router configures authentication information for the authenticated terminal in advance and then transmits the authentication information to the terminal.

In this way, when the router performs authentication and verification on the terminal, it may be determined whether the authentication information reported by the terminal is consistent with the authentication information generated for the terminal in advance by the router, so as to verify whether the identity of the terminal is an authenticated terminal (i.e., whether the terminal has a qualification of accessing the local area network for router security information). Accordingly, the identity information of the terminal is verified without third-party intervention, and the authentication process is simplified.

These embodiments provide another method for transmitting router security information. In this method, the authentication information is implemented in the form of a random token, and the acquired authentication information is verified in the following way:

verifying whether the random token satisfies a set condition, and determining the result of verification as successful authentication when the random token satisfies the set condition;

wherein the set condition may include any one or two of the following:

the random token is consistent with a random token generated by a router during the generation of the link of the local area; and the time of the random token is within a set validity period.

The random token involved herein may be in various forms. For example, the random token is a random token containing a timestamp indicating whether it is expired, a random token containing user information, or the like. The random token may also be of various types. For example, the random token is an access token, a secret token or the like. The random token may also be derived from various sources. For example, the random token is a random token determined in advance by the router and the terminal through consultation. For another example, the random token is a random token acquired from a reliable third party, or the like.

Figure 4:
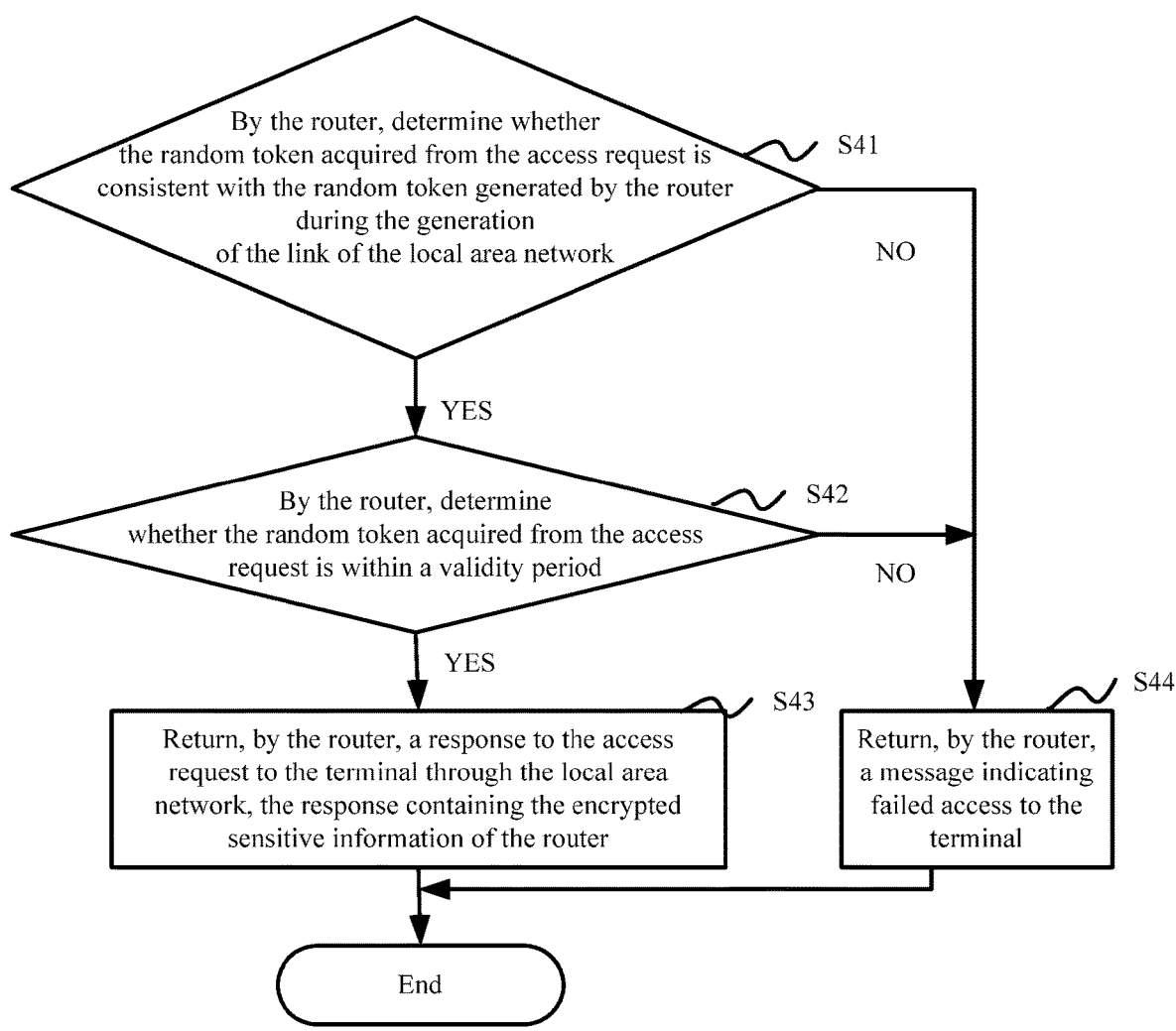
FIG. 4 is a flowchart of a specification implementation of authentication in the method for transmitting router security information (on the router side) according to some embodiments.

It can be seen from the above description that, when a random token is used as the authentication information, there are various methods for verifying the terminal according to the random token. In this embodiment, an optional method is used to verify the authentication information. As shown in FIG. 4, the following operation is performed.

Step 41: The router determines whether the random token acquired from the access request is consistent with the random token generated by the router during the generation of the link of the local area network; if the result of determination indicates that the random token acquired from the access request is consistent with the random token generated by the router during the generation of the link of the local area network, a step S42 will be executed; and, if the result of determination indicates that the random token acquired from the access request is not consistent with the random token generated by the router during the generation of the link of the local area network, the process proceeds to a step S44.

Step S42: The router determines whether the random token acquired from the access request is within a validity period; if the result of determination indicates that the random token is within the validity period, a step S43 will be executed; and, if the result of determination indicates that the random token is not within the validity period, the process proceeds to a step S44.

Step S43: The router returns a response to the access request to the terminal through the local area network, and this process ends, the response containing the encrypted router security information.

Step S44: The router returns a message indicating failed access to the terminal, and this process ends.

These embodiments provide another method for transmitting router security information. A trigger operation is added before the operation of transmitting, to the terminal requesting to acquire router security information, the generated link of the local area network for transmitting router security information. The trigger operation may be implemented in various ways. An optional way is as follows:

receiving, through a server, an acquisition request for router security information initiated by the terminal; and generating, according to the acquisition request, the link of the local area network for transmitting router security information.

These embodiments provide another method for transmitting router security information. In this method, when the router performs an encryption operation on the router security information, the key used is obtained in the following way.

A first key and/or a second key is acquired from the acquisition request for router security information initiated by the terminal, the first key being used for an encryption operation performed on the router security information, the second key being used for an encryption operation performed on the link of the local area network for transmitting router security information. The first key and the second key may be keys in any form. For example, the first key and the second key may be symmetric key, public key in asymmetric keys, or the like. Additionally, the first key and the second key may be the same or different.

These embodiments provide another method for transmitting router security information. In this method, any one or two of the first key and the second key may be configured in advance.

Figure 5:
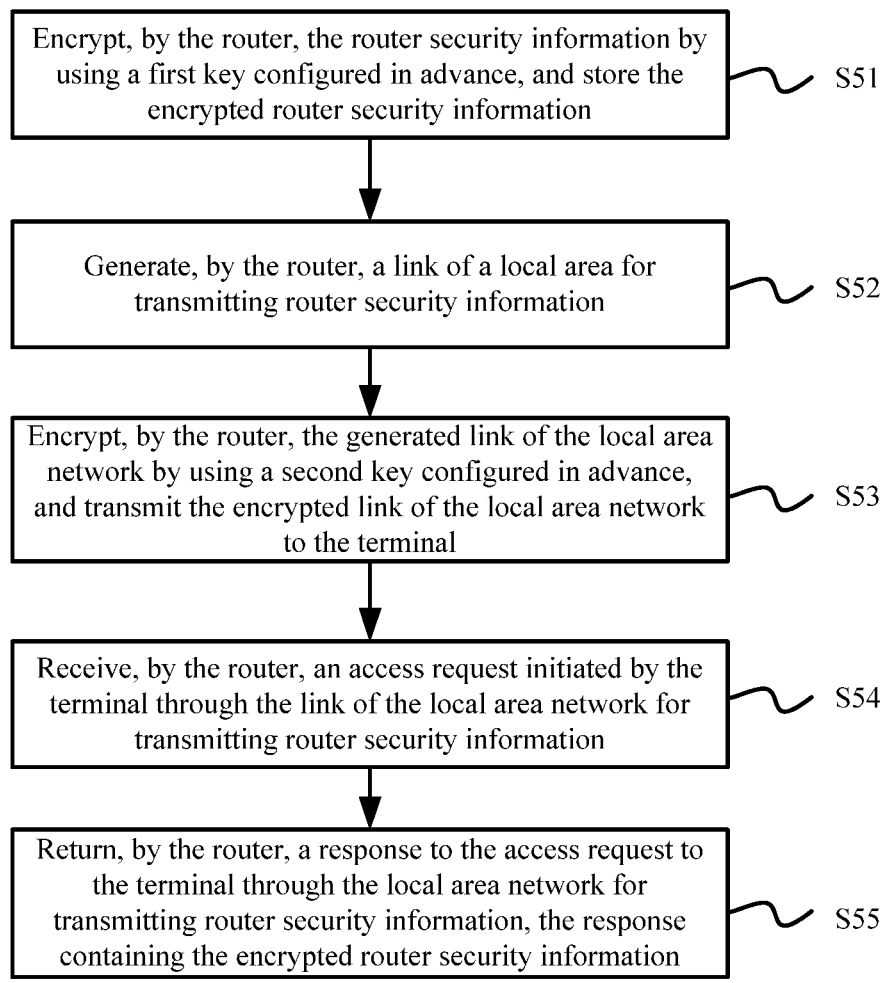
FIG. 5 is a flowchart of a specific implementation of the method for transmitting router security information (on the router side) according to some embodiments.

FIG. 5 is a flowchart of a method for transmitting router security information according to some embodiments. In this exemplary embodiment, the first key and the second key are configured in advance. In this case, as shown in FIG. 5, the implementation of the method for transmitting router security information includes the following operations.

Step S51: The router encrypts the router security information by using the first key configured in advance, and stores the encrypted router security information.

The operation in the step S51 may be triggered upon receiving the acquisition request for router security information transmitted by the terminal requesting to acquire router security information.

Step S52: The router generates a link of a local area network for transmitting the router security information.

In this embodiment, the link of the local area network for transmitting the router security information may be an HTTP link.

Step S53: The router encrypts the generated link of the local area network by using the second key configured in advance, and transmits the encrypted link of the local area network to the terminal. In the step S53, the router may encrypt the network address of the generated link of the local area network by regarding the network address as data in a text format.

Step S54: The router receives an access request initiated by the terminal through the link of the local area network for transmitting router security information.

Step S55: The router returns, to the terminal, a response to the access request through the local area network for transmitting router security information, the response containing the encrypted router security information.

In this embodiment, during the encryption of the router security information by the router in the step S51, a first encryption algorithm configured in advance or determined by the router and the terminal through consultation may be used. Correspondingly, during the encryption of the generated link of the local area network by the router in the step S53, a second encryption algorithm configured in advance or determined by the router and the terminal through consultation may be used. The first encryption algorithm and the second encryption algorithm involved herein may be same algorithm or different algorithms.

Figure 6:
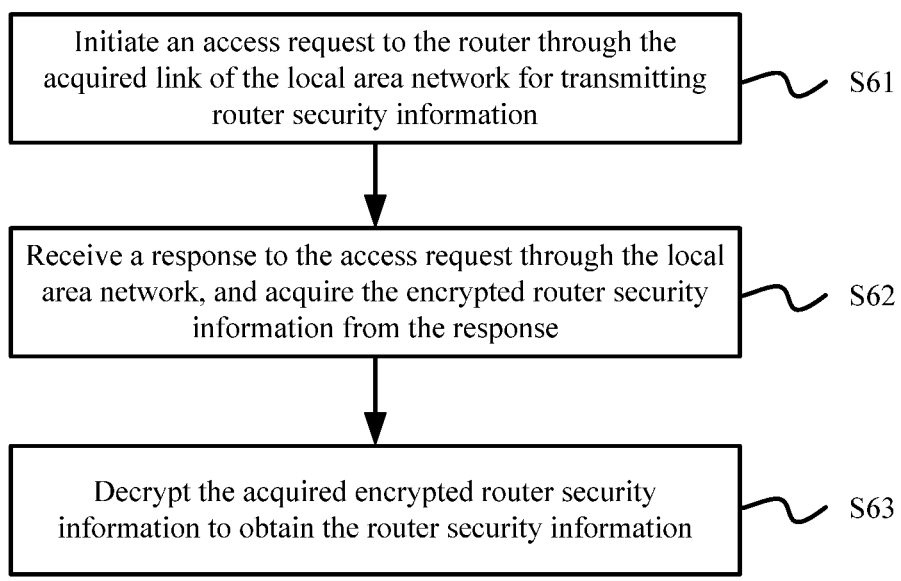
FIG. 6 is a flowchart of a method for transmitting router security information (on a terminal device side) according to some embodiments.

FIG. 6 is a flowchart of a method for transmitting router security information according to some embodiments. The method may be executed by a terminal. The implementation process of this method is shown in FIG. 6, including the following steps.

Step S61: An access request is initiated to a router through an acquired link of a local area network for transmitting router security information.

Step S62: A response to the access request is received through the local area network, and encrypted router security information is acquired from the response.

Step S63: The acquired encrypted router security information is decrypted to obtain the router security information.

It can be seen from the forgoing embodiments that, in the technical solutions of the present disclosure, the terminal capable of acquiring the link of the local area network is a terminal authenticated by the router, and the authenticated terminal may access a link of a local area network special for transmitting router security information, with the link of a local area network being established by the router, so as to acquire the encrypted router security information.

In this way, the possibility of remotely acquiring the router security information is eliminated, the possibility of acquiring the encrypted router security information by an illegal terminal that cannot access the link of the local area network is also eliminated, and the security of privacy information of a terminal device is greatly improved.

Moreover, in the technical solutions of the present disclosure, compared with the method for transmitting router security information by using one or more intermediate network elements in the related art, in the method for directly acquiring router security information by the authenticated terminal through the link of the local area network, the approach for acquiring the router security information is more convenient.

In some embodiments of the present disclosure, compared with the method for acquiring router security information by manually inputting an administration password in the related art, in the method for directly acquiring router security information by the authenticated terminal through the link of the local area network, the user does not need to input any information, and the user's operation is simplified.

Figure 7:
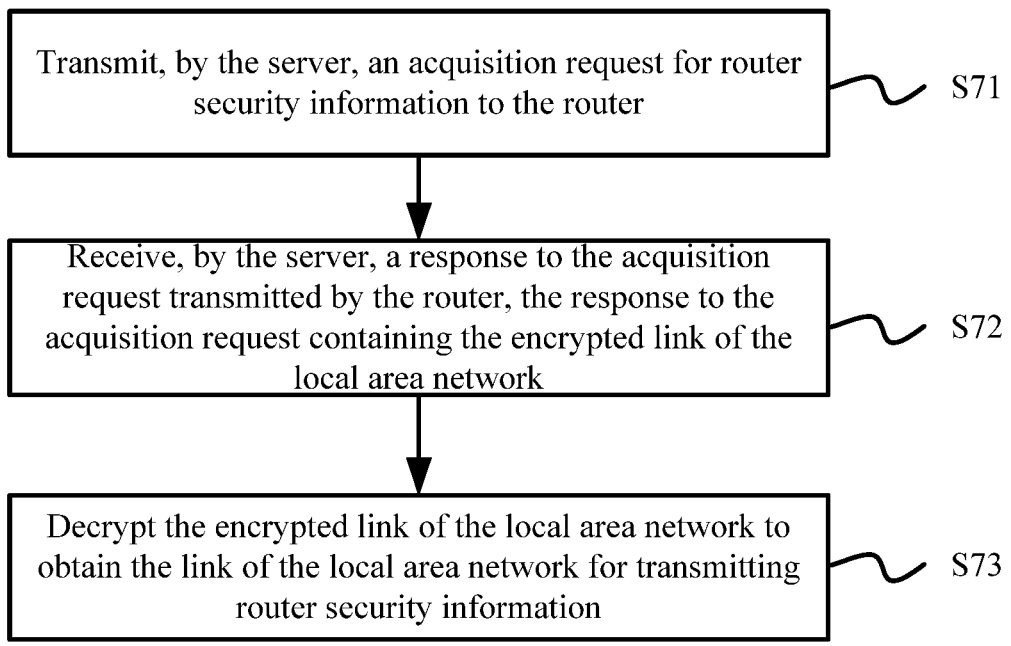
FIG. 7 is a flowchart of a method for acquiring a link of a local area network for transmitting router security information in the method for transmitting router security information according to some embodiments.

These embodiments provide another method for transmitting router security information. As shown in FIG. 7, before the execution of the step S61, the following operations are performed.

Step S71: An acquisition request for router security information is transmitted to the router through the server.

Step S72: A response to the acquisition request transmitted by the router is received through the server, the response to the acquisition request containing the encrypted link of the local area network.

Step S73: The encrypted link of the local area network is decrypted to obtain the link of the local area network for transmitting router security information.

Upon transmitting an acquisition request for router security information to the router, the terminal device may trigger the router to generate the link of the local area network. Therefore, upon receiving the response to the acquisition request, the terminal device may extract the encrypted link of the local area network from the response.

These embodiments provide another method for transmitting router security information, further including the following operation.

Authentication information is transmitted in the access requested initiated for the router; the authentication information being used for an authentication operation of the router when the terminal accesses the link of the local area network for transmitting the router security information. Thus, after the terminal transmits the authentication information to the router, the authentication operation may be performed on the router side, and it is determined according to the result of authentication whether the terminal has a qualification of accessing the link of the local area network for transmitting router security information, so that the security of the local area network is improved.

The authentication information transmitted to the router by the terminal may be derived from various sources. The authentication information may be generated from the information on the terminal side. For example, the authentication information may be generated according to any one of or a combination of more of the user identifier of the terminal, the user key, the history information of accessing the router by the user or the like.

The authentication information may also be determined by the terminal and the router through consultation. For example, unique identification information or special information with validity or the like can be configured for the terminal authenticated by the router. In this case, the consulted authentication information is shared in advance between two parties involved in the consultation.

These embodiments provide another method for transmitting router security information. In this method, the authentication information transmitted to the router by the terminal may be acquired in the following way.

When the link of the local area network for transmitting router security information is obtained, the authentication information is extracted from the link of the local area network for transmitting router security information.

In this mode, the authentication information is determined in advance by the terminal and the router through consultation, and the authentication information is issued to the terminal side in advance by the router side, so that the authentication information is shared between two parties involved in the consultation. In this way, the terminal may report the acquired authentication information upon transmitting any request to the router, so that it is convenient to realize successful authentication and verification on the router side.

These embodiments provide another method for transmitting router security information. In this method, the authentication information is implemented by using a random token. The random token may be in various forms, for example, a random token containing a timestamp indicating whether it is expired, a random token containing user information or the like. For another example, the random token is an access token, a secret token or the like.

The random token may also be derived from various sources. For example, the random token is a random token generated by the terminal itself. For another example, the random token is a random token acquired from a reliable third party by the terminal side, or the like. For another example, the random token is a random token determined in advance by the terminal and the router through consultation.

These embodiments provide another method for transmitting router security information. In this method, the terminal consults with the router to determine keys used in the encryption operation of the router security information in the following way.

In the process of transmitting, through the server, an acquisition request for router security information to the router, a first key and/or a second key is transmitted in the acquisition request, the first key being used for an encryption operation performed on the router security information of the router, the second key being used for an encryption operation performed on the link of the local area network for transmitting the router security information.

Thus, during the encryption operation on the router security information, keys may be determined by the terminal side and the router through consultation. That is, the terminal is used as a decryption party, a key for encryption may be generated in advance and the key is then notified to the router. In this way, in the subsequent decryption operation, the terminal can perform the decryption operation without acquiring the key for decryption.

Moreover, the terminal is used as a generation party of the key and only transmits the key to the router, so that the security of the key can be improved and the security of the encrypted router security information can be further improved. The first key transmitted by the terminal may be a symmetric key, or a public key in asymmetric encryption. In case of the symmetric key, after the terminal transmits the symmetric key to the router, the terminal uses the transmitted symmetric key during the decryption of the encrypted router security information.

In case of the asymmetric key, after the terminal transmits the public key in the asymmetric key to the router, the terminal needs to use a private key in the asymmetric key during the decryption of the encrypted router security information, so that the security of the router security information can be better ensured.

Similar to the first key, the second key may also be implemented by using keys in various forms, and will not be repeated here. The first key and the second key may be different keys. In this case, the decryption of the router security information and the decryption of the link of the local area network for transmitting router security information are different decryption operations, so that the security of the router security information can be improved. Additionally, the first key and the second key may also be same key, so that the decryption operation on the terminal side is simplified.

Figure 8:
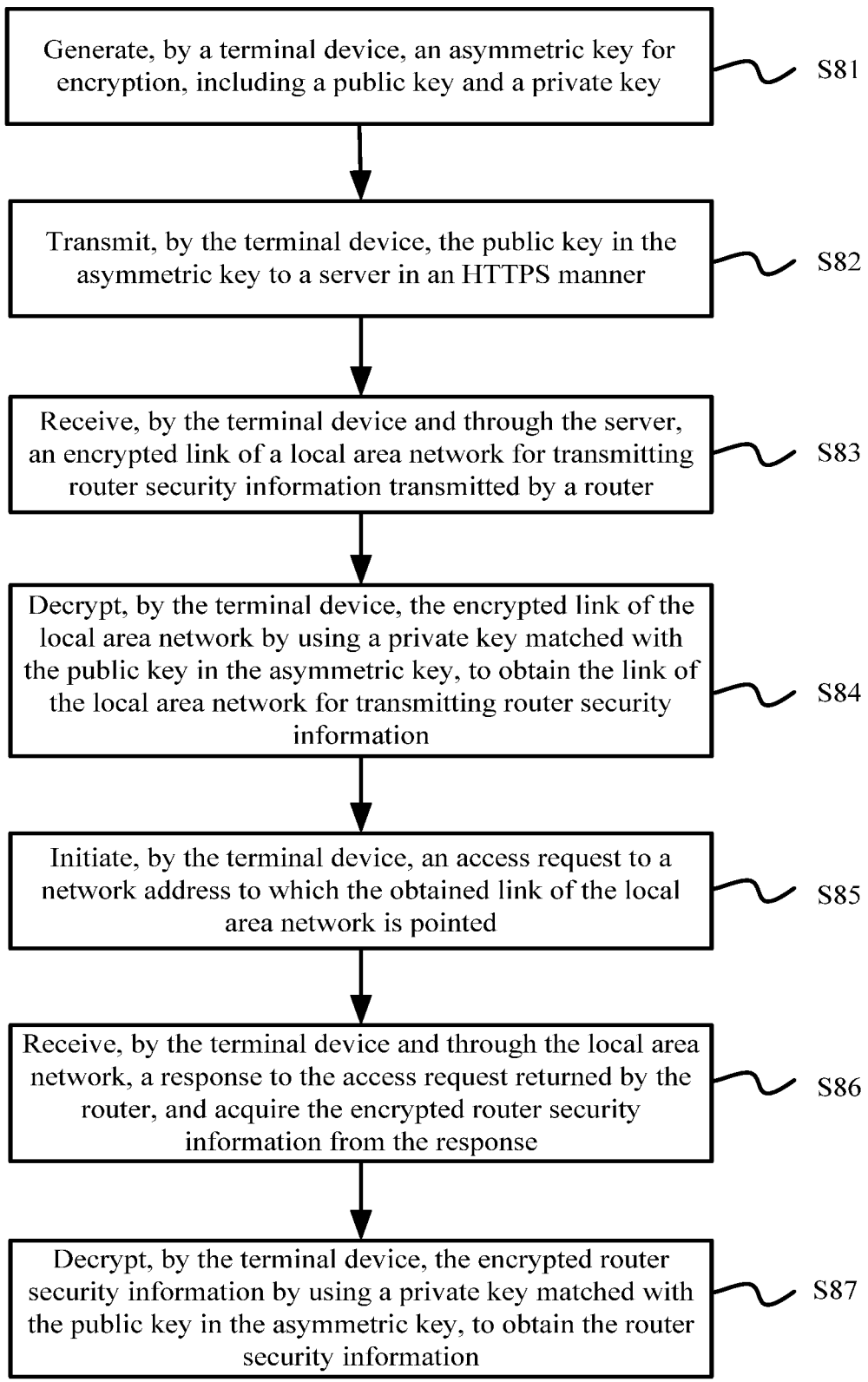
FIG. 8 is a detailed flowchart of the method for transmitting router security information (on the terminal device side) according to some embodiments.

FIG. 8 is a flowchart of a method for transmitting router security information according to some embodiments. This method is applied in an application scenario where the first key and the second key are determined by a router and a terminal device through consultation. The specific negotiation method is as follows: the terminal device notifies the router of a public key in the autonomously generated asymmetric key, and determines the first key and the second key to be a same key, wherein both the first key and the second key are a public key in the asymmetric key generated in advance by the terminal. In this scenario, as shown in FIG. 8, the implementation process of the method for acquiring router security information includes the following operations.

Step S81: A terminal device generates an asymmetric key for encryption, including a public key and a private key.

Step S82: The terminal device transmits the public key in the asymmetric key to a server in an HTTPS manner.

In the step S82, the terminal device may transmit, to the server, an HTTPS request to acquire router security information, and the public key in the asymmetric key is carried by the HTTPS request. The HTTPS request may be in form of an HTTPS protocol combined with account authentication, so that the security of the public key can be improved.

Step S83: The terminal device receives, through the server, an encrypted link of a local area network for transmitting router security information transmitted by a router.

In the step S83, the encrypted link of the local area network for transmitting router security information received by the terminal device may be acquired from the response to the HTTPS request transmitted by the router.

Step S84: The terminal device uses a private key matched with the public key in the asymmetric key to decrypt the encrypted link of the local area network for transmitting router security information, so as to obtain the link of the local area network for transmitting router security information.

Step S85: The terminal device initiates an access request to a network address to which the obtained link of the local area network is pointed, that is, the terminal device initiates an access request to the router through the established local area network.

In the step S85, the access request transmitted by the terminal device may be used for acquiring the router security information.

Step S86: The terminal device receives, through the local area network, a response to the access request returned by the router, and acquires the encrypted router security information from the response.

Step S87: The terminal device uses a private key matched with the public key in the asymmetric key to decrypt the encrypted router security information, to obtain the router security information.

Figure 9:
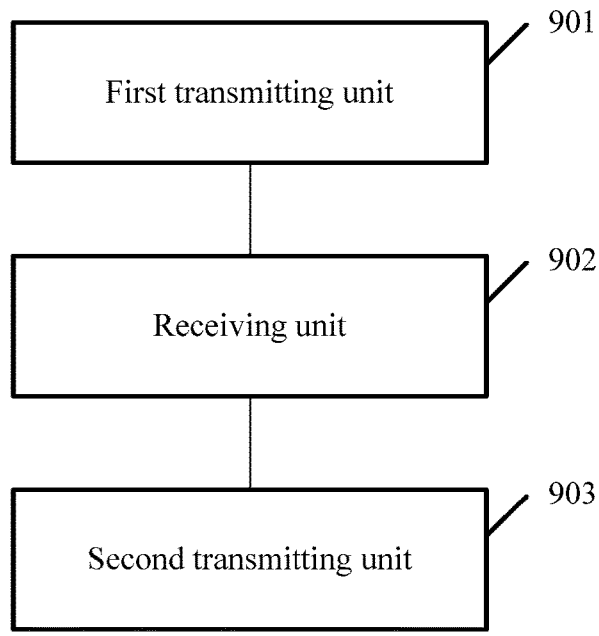
FIG. 9 is a structure diagram of an apparatus for transmitting router security information (on the router side) according to some embodiments.

FIG. 9 is structure diagram of an apparatus for transmitting router security information according to some embodiments. The apparatus may be a router, or another terminal device having a routing function or the like. With reference to FIG. 9, the apparatus may include the following portions:

a first transmitting unit 901 configured to transmit, to a terminal requesting to acquire router security information, a generated link of a local area network for transmitting the router security information;

a receiving unit 902 configured to receive an access request initiated for a link of a local area network for transmitting router security information by the terminal; and a second transmitting unit 903 configured to return, through the local area network for transmitting router security information, a response to the access request to the terminal, the response containing encrypted router security information.

These embodiments provide another apparatus for transmitting router security information, further including an encryption unit configured to encrypt the generated link of the local area network for transmitting the router security information.

Correspondingly, the first transmitting unit is configured to transmit the encrypted link of the local area network to the terminal requesting to acquire the router security information.

The key used for encrypting the generated link of the local area network for transmitting security information may be configured in advance, or determined by this apparatus and the terminal requesting to acquire router security information through consultation.

Figure 10:
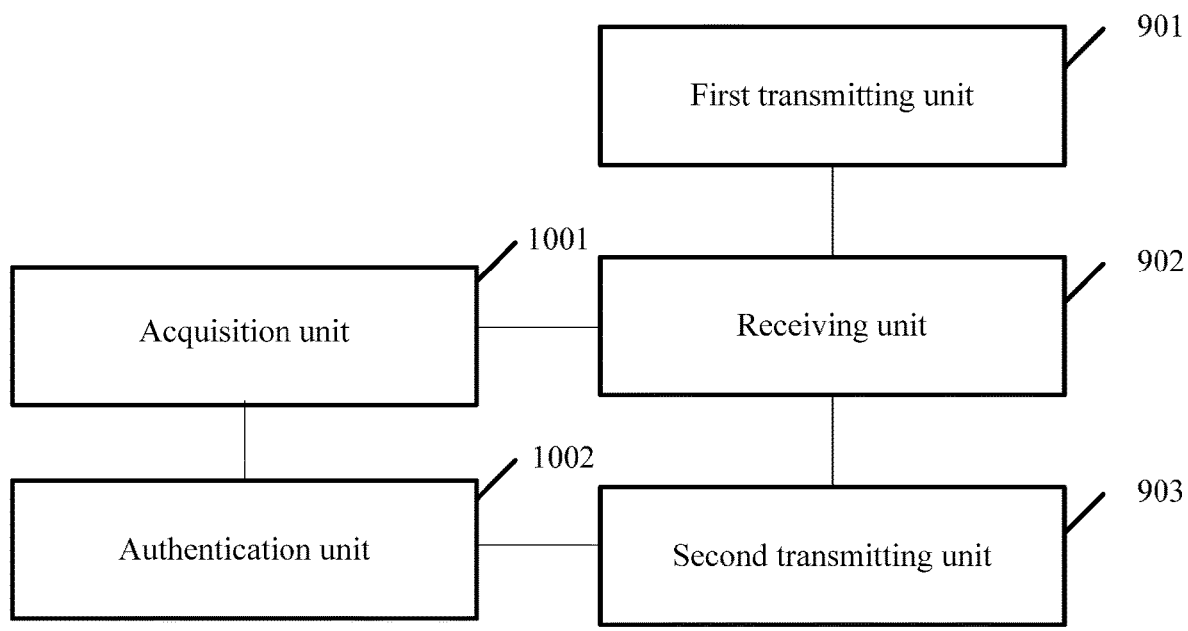
FIG. 10 is a structure diagram of a specific implementation of the apparatus for transmitting router security information (on the router side) according to some embodiments.

These embodiments provide another apparatus for transmitting router security information, as shown in FIG. 10, including a first transmitting unit 901, a receiving unit 902 and a second transmitting unit 903, and additionally including an acquisition unit 1001 and an authentication unit 1002.

The acquisition unit 1001 is configured to acquire authentication information from the access request initiated by the terminal.

The authentication unit 1002 is configured to verify the authentication information acquired by the acquisition unit 1001.

Correspondingly, the second transmitting unit 903 is further configured to return the response to the access request to the terminal through the local area network when a result of verification of the authentication information by the authentication unit 1002 is successful authentication.

These embodiments provide another apparatus for transmitting router security information. In this apparatus, the first transmitting unit 901 is further configured to, in the process of transmitting, to the terminal requesting to acquire the router security information, the generated link of the local area network for transmitting the router security information, transmit authentication information to the terminal, the authentication information being used for an authentication operation performed when the terminal accesses the link of the local area network for transmitting router security information.

These embodiments provide another apparatus for transmitting router security information. In this apparatus, the involved authentication information may include a random token. In this case, the authentication unit 1002 may verify the authentication information acquired by the acquisition unit 1001 in the following way:

verifying whether the random token satisfies a set condition, and determining the result of verification as successful authentication when the random token satisfies the set condition.

The set condition includes any one or two of the following:

the random token is consistent with a random token generated by a router during the generation of the link of the local area network; and the time of the random token is within a set validity period.

Figure 11:
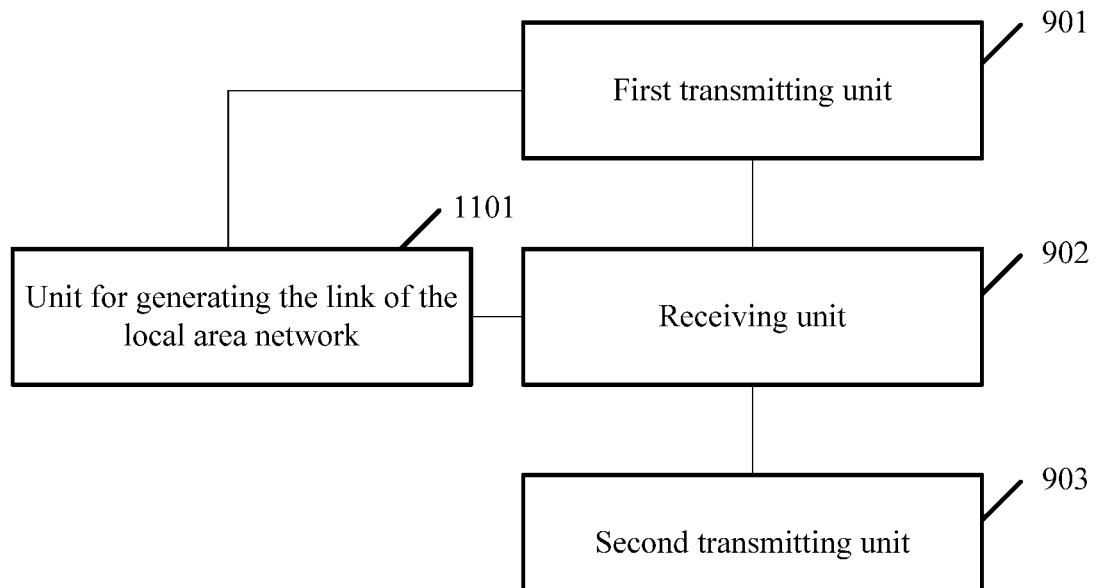
FIG. 11 is a structure diagram of a specific implementation of the apparatus for transmitting router security information (on the router side) according to some embodiments.

These embodiments provide another apparatus for transmitting router security information. As shown in FIG. 11, the apparatus includes a first transmitting unit 901, a receiving unit 902 and a second transmitting unit 903, and additionally includes a unit 1101 for generating the link of the local area network.

In this case, the receiving unit 902 is further configured to receive, through a server, an acquisition request for the router security information initiated by the terminal.

The unit 1101 for generating the link of the local area network is configured to generate, according to the acquisition request received by the receiving unit 902, the link of the local area network for transmitting the router security information.

These embodiments provide another apparatus for transmitting router security information. In this apparatus, the receiving unit 902 is further configured to acquire a first key and/or a second key from the acquisition request for the router security information initiated by the terminal, the first key being used for an encryption operation performed on the router security information, the second key being used for an encryption operation performed on the link of the local area network for transmitting router security information.

For the apparatuses in the foregoing embodiments, the specific operations executed by each unit have been described in detail in the embodiments of the methods, and will not be repeated here.

Figure 12:
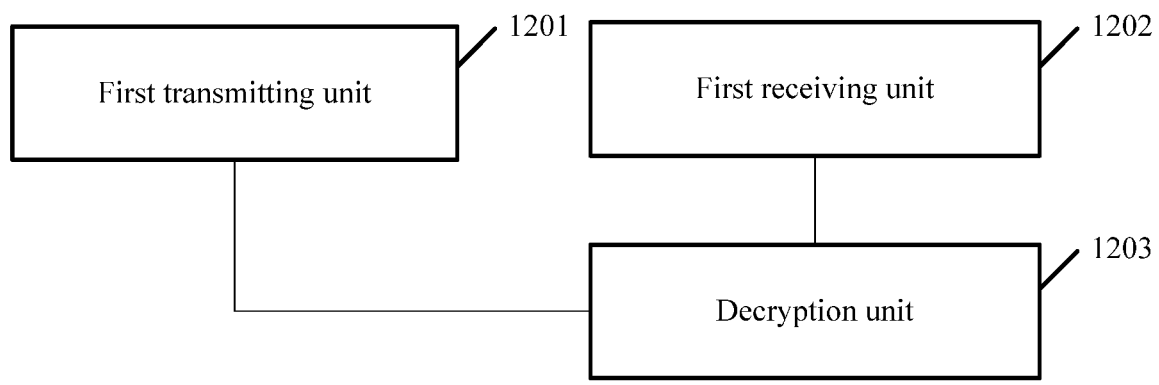
FIG. 12 is a structure diagram of an apparatus for transmitting router security information (on a mobile terminal side) according to some embodiments.

FIG. 12 is structure diagram of an apparatus for transmitting router security information according to some embodiments. This apparatus may be a mobile terminal, or a stand-alone device disposed on the mobile terminal, or the like. With reference to FIG. 12, the apparatus may include the following portions:

a first transmitting unit 1201 configured to initiate an access request to a router through a network address to which the acquired link of a local area network for transmitting router security information is pointed;

a first receiving unit 1202 configured to receive a response to the access request through the local area network for transmitting router security information, and acquire encrypted router security information from the response; and a decryption unit 1203 configured to decrypt the encrypted router security information acquired by the first receiving unit 1201 to obtain the router security information.

Figure 13:
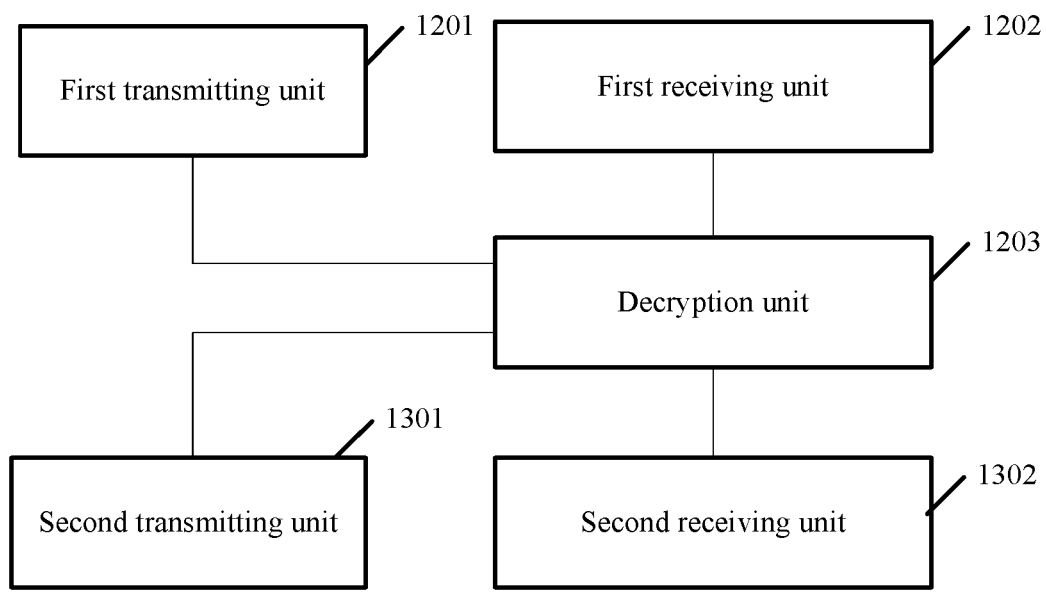
FIG. 13 is a specific structure diagram of the apparatus for transmitting router security information (on the mobile terminal side) according to some embodiments.

These embodiments provide another apparatus for transmitting router security information, as shown in FIG. 13, further includes a second transmitting unit 1301 and a second receiving unit 1302 in addition to the transmitting unit 1201, the first receiving unit 1202 and the decryption unit 1203.

The second seconding unit 1301 is configured to transmit, through a server, an acquisition request for router security information to the router.

The second receiving unit 1302 is configured to receive, through the server, a response to the acquisition request transmitted by the router, the response to the acquisition request containing encrypted link of the local area network.

Correspondingly, the decryption unit 1203 is further configured to decrypt the encrypted link of the local area network in the response to the acquisition request received by the second receiving unit 1302 to obtain the link of the local area network for transmitting router security information.

These embodiments provide another apparatus for transmitting router security information. In this apparatus, the first transmitting unit 1201 is further configured to transmit authentication information in the transmitted access request, the authentication information being used for an authentication operation performed by the router when the terminal accesses the link of the local area network.

These embodiments provide another apparatus for transmitting router security information. An acquisition unit is additionally provided in this apparatus. This unit is configured to extract the authentication information from the link of the local area network for transmitting router security information obtained in by the decryption unit 1203.

These embodiments provide another apparatus for transmitting router security information. In this apparatus, the involved authentication information includes a random token.

These embodiments provide another apparatus for transmitting router security information. In this apparatus, the second receiving unit 1301 is further configured to transmit a first key and/or a second key in the transmitted acquisition request for the router security information, the first key being used for an encryption operation performed on the router security information, the second key being used for an encryption operation performed on the link of the local area network for transmitting router security information.

For the apparatuses in the foregoing embodiments, the specific operations executed by each unit have been described in detail in the embodiments of the methods, and will not be repeated here.

Some embodiments provide a system for transmitting router security information, at least including the apparatuses shown in FIGS. 9 and 12 in the foregoing embodiments, and the transmission of the router security information may be realized by cooperatively using the apparatuses shown in FIGS. 9 and 12. For the apparatuses shown in FIGS. 9 and 12 in this embodiment, the specific operations executed by each unit have been described in detail in the embodiments of the methods, and will not be repeated here.

Some embodiments provide an apparatus for transmitting router security information, including a processor, and a memory configured to store instructions executable by the processor;

wherein the processor is configured to:

transmit, to a terminal requesting to acquire router security information, a generated link of a local area network for transmitting the router security information;

receive an access request initiated by the terminal through a network address to which the link of the local area network is pointed; and return, through the local area network, a response to the access request to the terminal, the response containing encrypted router security information.

For the apparatus in this embodiment, the specific operations executed by processor have been described in detail in the embodiments of the methods for transmitting router security information, and will not be repeated here.

Some embodiments provide an apparatus for transmitting router security information, including a processor, and a memory configured to store instructions executable by the processor;

wherein the processor is configured to:

initiate an access request to a router, through a network address to which the acquired link of a local area network for transmitting the router security information is pointed;

receive, through the local area network, a response to the access request, and acquire encrypted router security information from the response; and decrypt the acquired encrypted router security information to obtain the router security information.

For the apparatus in this embodiment, the specific operations executed by processor have been described in detail in the embodiments of the methods for transmitting router security information, and will not be repeated here.

Some embodiments provide a non-temporary computer-readable storage medium, instructions in the storage medium, when executed by a processor of a terminal device, enabling the terminal device to execute a method for transmitting router security information, the method including steps of:

transmitting, to a terminal requesting to acquire router security information, a generated link of a local area network for transmitting the router security information;

receiving an access request initiated by the terminal through a network address to which the link of the local area network is pointed; and returning, through the local area network, a response to the access request to the terminal, the response containing encrypted router security information.

For the non-temporary computer-readable storage medium in this embodiment, the specific process of the method for transmitting router security information executed by the terminal device has been described in the embodiments of the methods for transmitting router security information and will not be repeated here.

Some embodiments provide a non-temporary computer-readable storage medium, instructions in the storage medium, when executed by a processor of a mobile terminal, enabling the mobile terminal to execute a method for transmitting router security information, the method including steps of:

initiating an access request to a router, through a network address to which the acquired link of a local area network for transmitting the router security information is pointed;

receiving, through the local area network, a response to the access request, and acquiring encrypted router security information from the response; and decrypting the encrypted router security information to obtain the router security information.

For the non-transitory computer-readable storage medium in this embodiment, the specific process of the method for transmitting router security information executed by the mobile terminal has been described in the embodiments of the methods for transmitting router security information and will not be repeated here.

Various embodiments of the present disclosure can have one or more of the following advantages.

A router establishes a local area network for transmitting security information and transmits the encrypted router security information through this local area network. In this way, the router security information can be acquired only by a terminal device that accesses this local area network and has an encryption key of the router security information. Thus, devices that cannot access this local area network cannot acquire the router security information, so that the possibility of remotely acquiring the router security information is eliminated. Moreover, by the mode of not remotely exchanging the router security information, the situation where the router security information is transmitted on the cloud is also avoided, and the security of privacy information of terminal devices is improved.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

In the present disclosure, the terms "installed," "connected," "coupled," "fixed" and the like shall be understood broadly, and can be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

In the description of the present disclosure, the terms "one embodiment," "some embodiments," "example," "specific example," or "some examples," and the like can indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In some embodiments, the control and/or interface software or app can be provided in a form of a non-transitory computer-readable storage medium having instructions stored thereon is further provided. For example, the non-transitory computer-readable storage medium can be a ROM, a CD-ROM, a magnetic tape, a floppy disk, optical data storage equipment, a flash drive such as a USB drive or an SD card, and the like.

Implementations of the subject matter and the operations described in this disclosure can be implemented in digital electronic circuitry, or in computer software, firmware, or hardware, including the structures disclosed herein and their structural equivalents, or in combinations of one or more of them. Implementations of the subject matter described in this disclosure can be implemented as one or more computer programs, i.e., one or more portions of computer program instructions, encoded on one or more computer storage medium for execution by, or to control the operation of, data processing apparatus.

Alternatively, or in addition, the program instructions can be encoded on an artificially-generated propagated signal, e.g., a machine-generated electrical, optical, or electromagnetic signal, which is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium can be tangible.

The operations described in this disclosure can be implemented as operations performed by a data processing apparatus on data stored on one or more computer-readable storage devices or received from other sources.

The devices in this disclosure can include special purpose logic circuitry, e.g., an FPGA (field-programmable gate array), or an ASIC (application-specific integrated circuit). The device can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The devices and execution environment can realize various different computing model infrastructures, such as web services, distributed computing, and grid computing infrastructures.

A computer program (also known as a program, software, software application, app, script, or code) can be written in any form of programming language, including compiled or interpreted languages, declarative or procedural languages, and it can be deployed in any form, including as a stand-alone program or as a portion, component, subroutine, object, or other portion suitable for use in a computing environment. A computer program can, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more portions, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, e.g., an FPGA, or an ASIC.

Processors or processing circuits suitable for the execution of a computer program include, by way of example, both general and special purpose microprocessors, and any one or more processors of any kind of digital computer. Generally, a processor will receive instructions and data from a read-only memory, or a random-access memory, or both. Elements of a computer can include a processor configured to perform actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented with a computer and/or a display device, e.g., a VR/AR device, a head-mount display (HMD) device, a head-up display (HUD) device, smart eyewear (e.g., glasses), a CRT (cathode-ray tube), LCD (liquid-crystal display), OLED (organic light emitting diode), or any other monitor for displaying information to the user and a keyboard, a pointing device, e.g., a mouse, trackball, etc., or a touch screen, touch pad, etc., by which the user can provide input to the computer.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A method for transmitting router security information, which is applied in a router, comprising:
   receiving, through a server, an acquisition request for the router security information initiated by a terminal;
   generating, according to the acquisition request, the link of a local area network for transmitting the router security information;
   acquiring a first key and/or a second key from the acquisition request for the router security information initiated by the terminal, the first key being used for an encryption operation performed on the router security information, the second key being used for an encryption operation performed on the link of the local area network;
   transmitting, to the terminal requesting to acquire the router security information, a generated link of the local area network for transmitting the router security information;
   receiving an access request initiated by the terminal through a network address to which the link of the local area network is pointed; and returning, through the local area network, a response to the access request to the terminal, the response containing encrypted router security information.

2. The method according to claim 1, wherein the transmitting, to a terminal requesting to acquire router security information, a generated link of a local area network for transmitting the router security information comprises:
encrypting the generated link of the local area network for transmitting the router security information, and transmitting the encrypted link of the local area network to the terminal requesting to acquire the router security information.

3. The method according to claim 2, further comprising:
acquiring authentication information from the access request initiated by the terminal; and
verifying the authentication information; and
the returning, through the local area network, the response to the access request to the terminal comprises:
when a result of verification of the authentication information is successful authentication, returning, through the local area network, the response to the access request to the terminal.

4. The method according to claim 3, further comprising:
in the process of transmitting, to the terminal requesting to acquire the router security information, the generated link of the local area network for transmitting the router security information, transmitting the authentication information to the terminal, the authentication information being used for an authentication operation performed when the terminal accesses the link of the local area network.

5. The method according to claim 4, wherein the authentication information comprises a random token, and the verifying the authentication information comprises:
verifying whether the random token satisfies a set condition, and determining the result of verification as successful authentication when the random token satisfies the set condition;
wherein the set condition comprises any one or two of the following:
the random token is consistent with a random token generated by a router during the generation of the link of the local area network; and
the time of the random token is within a set validity period.

6. A method for transmitting router security information, which is applied in a terminal device, comprising:
in a process of transmitting, through the server, an acquisition request for router security information to the router, transmitting a first key and/or a second key in the acquisition request, the first key being used for an encryption operation performed on the router security information, the second key being used for an encryption operation performed on the link of a local area network;
initiating an access request to the router, through a network address to which acquired the link of the local area network for transmitting router security information is pointed;
receiving, through the local area network, a response to the access request, and acquiring encrypted router security information from the response; and
decrypting the encrypted router security information to obtain the router security information.

7. The method according to claim 6, further comprising steps of:

transmitting, through a server, an acquisition request for the router security information to the router;
receiving, through the server, a response to the acquisition request transmitted by the router, the response to the acquisition request containing the encrypted link of the local area network; and
decrypting the encrypted link of the local area network to obtain the link of the local area network.

8. The method according to claim 6, further comprising:
transmitting authentication information in the access request, the authentication information being used for an authentication operation by the router when the terminal accesses the link of the local area network.

9. The method according to claim 8, further comprising:
upon acquiring the link of the local area network for transmitting the router security information, extracting the authentication information from the link of the local area network.

10. The method according to claim 8, wherein the authentication information comprises a random token.

11. An apparatus implementing the method according to claim 6, comprising:
a processor; and
memory storing a computer program that, when executed by the processor, causes the processor to implement steps of the method.

12. The apparatus according to claim 11, wherein the computer program further causes the processor to:
transmit authentication information in the transmitted access request, the authentication information being used for an authentication operation performed by the router when the terminal accesses the link of the local area network; and
extract the authentication information from the link of the local area network;
wherein the authentication information comprises a random token.

13. An apparatus for transmitting router security information, comprising:
a processor; and
memory storing a computer program that, when executed by the processor, causes the processor to:
receive, through a server, an acquisition request for router security information initiated by a terminal; and
generate, according to the acquisition request, a link of a local area network for transmitting the router security information;
acquire a first key and/or a second key from the acquisition request for the router security information initiated by the terminal, the first key being used for an encryption operation performed on the router security information, the second key being used for an encryption operation performed on the link of the local area network;
transmit, to the terminal requesting to acquire the router security information, a generated link of the local area network for transmitting the router security information;
receive an access request initiated by the terminal through a network address to which the link of the local area network is pointed; and
return, through the local area network, a response to the access request to the terminal, the response containing encrypted router security information.

14. The apparatus according to claim 13, wherein the computer program further causes the processor to:

encrypt the generated link of the local area network for transmitting the router security information; and transmit the encrypted link of the local area network to the terminal requesting to acquire the router security information.

15. The apparatus according to claim 14, wherein the computer program further causes the processor to:

acquire authentication information from the access request initiated by the terminal;

verify the authentication information; and return the response to the access request to the terminal through the link of the local area network when a result of verification of the authentication information is successful authentication.

16. The apparatus according to claim 15, wherein the computer program further causes the processor to:

in the process of transmitting, to the terminal requesting to acquire the router security information, the generated link of the local area network for transmitting the router security information, transmit the authentication information to the terminal, the authentication information being used for an authentication operation performed when the terminal accesses the link of the local area network.

17. The apparatus according to claim 15, wherein the authentication information comprises a random token, and the computer program further causes the processor to:

verify whether the random token satisfies a set condition, and determining the result of verification as successful authentication when the random token satisfies the set condition;

wherein the set condition comprises at least one of:

the random token is consistent with a random token generated by a router during the generation of the link of the local area network; and the time of the random token is within a set validity period.

18. The apparatus according to claim 17, further comprising a unit for generating the link of the local area network;

the receiving unit is further configured to receive, through a server, an acquisition request for the router security information initiated by the terminal; and the unit for generating the link of the local area network generates, according to the acquisition request received by the receiving unit, the link of the local area network for transmitting the router security information.

* * * * *